United States Patent [19]

Kuhn

[11] Patent Number: 5,175,486
[45] Date of Patent: Dec. 29, 1992

[54] DUAL-LEVEL-OUTPUT CIRCUIT FOR CHARGING GENERATOR

[75] Inventor: Edgar Kuhn, Gerlingen/Leonberg, Fed. Rep. of Germany

[73] Assignee: Robert Bosch GmbH, Stuttgart, Fed. Rep. of Germany

[21] Appl. No.: 543,818

[22] PCT Filed: Dec. 28, 1988

[86] PCT No.: PCT/EP88/01207
§ 371 Date: Jul. 6, 1990
§ 102(e) Date: Jul. 6, 1990

[87] PCT Pub. No.: WO90/07816
PCT Pub. Date: Jul. 12, 1990

[51] Int. Cl.$^5$ ................................. H02J 7/14
[52] U.S. Cl. ........................ 320/64; 322/33; 322/73; 322/28; 320/35; 320/46
[58] Field of Search ............ 322/72, 73, 33, 28; 307/16; 320/64, 35, 36, 46

[56] References Cited

U.S. PATENT DOCUMENTS

| | | | |
|---|---|---|---|
| 3,602,796 | 8/1971 | Bleher | 322/73 X |
| 3,868,558 | 2/1975 | Winkley et al. | 322/28 X |
| 4,136,311 | 1/1979 | Scheidler | 322/73 X |
| 4,310,793 | 1/1982 | Sheldrake et al. | 322/73 X |
| 4,384,245 | 5/1983 | Metter | 322/73 X |
| 4,689,545 | 8/1987 | Komurasaki et al. | 322/73 X |

Primary Examiner—R. J. Hickey
Attorney, Agent, or Firm—Michael J. Striker

[57] ABSTRACT

In a circuit (20) for use in controlling a battery-charging process and producing an output (S) which has one of two distinct levels (S1, S2), these levels are independently adjustable by adjusting variable resistors (R1, R2). Switching between the two levels is effected by transistors (T1, T2) in response to a varying input signal (X).

The input signal (X) is derived from a hydrogen/oxygen recombinator (40, FIG. 4, not shown) with a thermoelectric transducer which produces an abrupt change in output when the battery is fully-charged. To ensure a gradual switch-over to a lower battery-charging rate, the output of the transducer is passed via an integrator (41) to the circuit (20). The switch means for one of the resistors (R2) may be omitted (FIG. 1 not shown).

8 Claims, 1 Drawing Sheet

DUAL-LEVEL-OUTPUT CIRCUIT FOR CHARGING GENERATOR

The present invention relates to a dual-level output circuit, for example of the type used to control the charging of a motor-vehicle battery. DE-A-3041200 discloses a controller in which the charging current supplied to a battery depends upon the state of charge of the battery, i.e. whether it is substantially fully charged. There is danger of excess gassing if a high charging current is supplied to a battery which is already fully-charged.

According to a first aspect of the present invention there is provided a circuit having an input and an output which can deliver at least two distinct output levels depending upon the level of a signal applied to the input, characterised in that the circuit comprises at least two independently variable resistors and switch means connected thereto and responsive to the input signal, whereby the output levels may be adjusted to independent values.

An advantage of the above-described circuit is that it may be readily adjusted for different specific applications. For example, even batteries of the same type have different charging characteristics. Also, the characteristics of a single battery vary with age and it is an advantage to be able to adjust independently the high and low charging rates (corresponding to a substantially flat and a substantially fully-charged battery).

In a preferred arrangement the variable resistors R1,R2 are connected in parallel and the switch means comprises first switch device T1 in series with the first variable resistor and a second switch device T2 in series with the second variable resistor. This has the advantage that the adjustment of the output levels is completely independent.

The switch means is preferably one or more transistors. This has the advantage of providing an arrangement suitable for gradual rather than instantaneous switching-over.

The circuit may receive its input signal from means responsive to the charge of the battery in the form of a hydrogen and oxygen recombinator and a transducer responsive to the temperature thereof. The transducer output may be connected to the circuit input via an integrator to ensure a gradual operation of the switch means. This has the advantage of reducing abrupt voltage fluctuations which, when charging a motor vehicle battery, can cause unwanted dimming and brightening of the vehicle lights. In an alternative arrangement the circuit receives its input signal from a device sensitive to gas pressure within the battery.

According to a second aspect of the present invention, there is provided a battery-charging arrangement comprising a voltage controller responsive to means for producing an input signal S which can have at least two distinct levels characterised in that said means comprises means for producing an output signal W which changes relatively abruptly when the battery charge reaches a predetermined level, means for receiving said signal and producing therefrom a relatively-gradually changing signal X, which is used to produce said distinct levels.

Preferred embodiments of the present invention will now be described, by way of example only, with reference to the accompanying drawings, of which:

Figure 1:
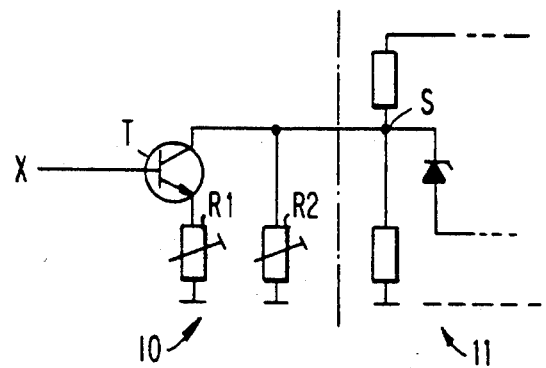
FIG. 1 is a circuit diagram of a first embodiment of the present invention used as in input stage to a voltage control circuit.
Figure 4:
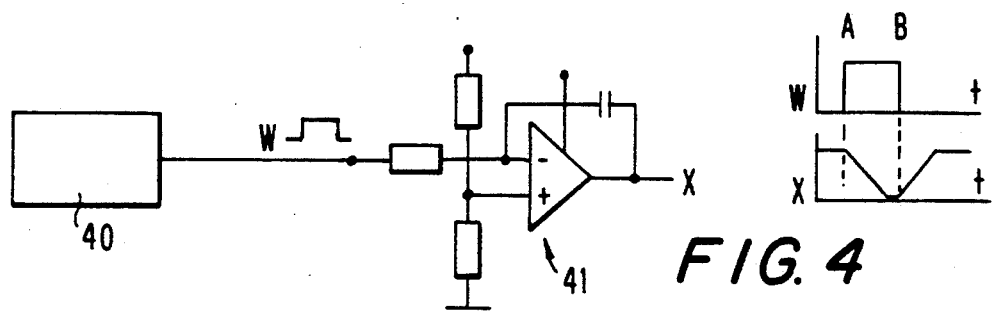
FIG. 4 shows a suitable circuit for supplying an input signal W to the circuits of FIGS. 1 and 2.

Referring to the drawings, FIG. 1 shows a circuit 10 connected as an input stage to a controller 11. The circuit is arranged to receive a varying input signal X, discussed below in connection with FIG. 4, which is applied to the base of a transistor T. The emitter of transistor T is connected to ground via a first variable resistor R1. The collector of transistor T is connected to the input of controller 11. Also connected between the input of controller 11 and ground is a second variable resistor R2. The circuit 10 provides an output signal S to the controller 11.

In use, when X is high, the transistor T is switched on and both resistors R1 and R2 are in the circuit. When X is low, transistor T is blocked and only resistor R2 is in the circuit. The two values of the resistance of the circuit correspond to the two levels of output voltage required.

An advantage of the above-described arrangement is that the resistors R1 and R2 may be varied to give independent output voltage levels S1,S2. With a predetermined value of R2, the value of control voltage S1 may be adjusted by varying R1. The value of control voltage S2 may be adjusted simply by varying R2.

A disadvantage of the above-described circuit is that adjustment of R2 also causes variation of S1 so that R1 needs to be adjusted after each adjustment of R2. This disadvantage is overcome by the circuit of FIG. 2.

Figure 2:
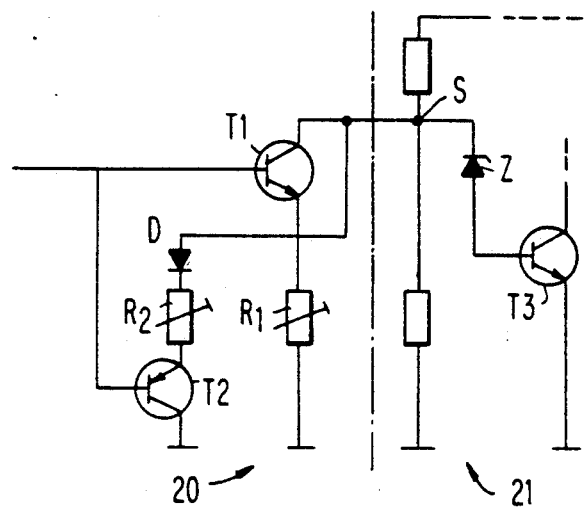
FIG. 2 is a similar circuit diagram of a second embodiment of the present invention.

In FIG. 2 a circuit 20 serves as the input stage to a controller 21. Input signal X is supplied to the base of a transistor T1 connected to ground via a variable resistor R1. In this embodiment, variable resistor R2 is connected between the input to controller 21 in series with a diode D and a further transistor T2.

Thus with X high, the resistance of the circuit is determined by T1 and R1. To obtain a definite resistance value (which is a function of the resistances of R1 and T1) T1 is operated in the emitter-follower mode so that the combined resistance is substantially independent of the transistor characteristics. To avoid T1 being reverse-driven the maximum value of X must be less than the voltage S, which, in use, is maintained practically constant by a clamping circuit comprising a zener diode Z and the base-emitter path of a transistor in the controller 21.

With X low, the resistance of the circuit is determined by T2 and R2, and T2 is also operated in the emitter-follower mode. Diode D ensures that transistor T2 is blocked when X is high; the diode can be replaced by a pair of diodes or a zener diode if required.

Circuit 20 has the same advantages as circuit 10. In addition the two output levels S1, S2 can be completely independently adjusted by varying R1 or R2 respectively. Adjusting one of the resistors does not necessitate adjustment of the other.

Figure 3:
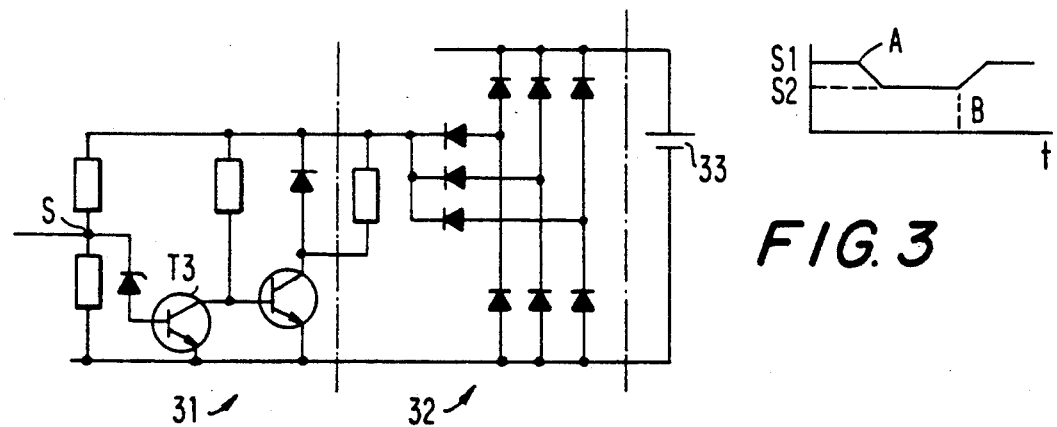
FIG. 3 shows a voltage control circuit with which the circuits of FIGS. 1 and 2 may be used, the voltage control circuit controlling the voltage supplied by a generator to a motor-vehicle battery.

The above-described circuits are particularly advantageous when employed in connection with circuits for the control of the charging process of a battery. Such a process will now be described with reference to FIG. 3 which shows the combination of a controller 31, a three-phase current generator 32 and a motor- vehicle battery 33. Until a fully-charged condition is achieved, the battery can be subjected to a relatively high voltage. After the fully-charged state has been reached, the charging voltage should be reduced by a certain amount; the achievement of this state is indicated by a change in the value of X. Thus X can be produced by any convenient device which determines the state of charge of a battery. One form of suitable device is a recombinator and a particularly advantageous arrangement employing such a device will now be described with reference to FIG. 4.

A recombinator 40 is a device which recombines into water the hydrogen and oxygen produced towards the end of the charging of a battery. This produces a relatively sudden heat of reaction which can be detected by a thermoelectric transducer, eg a thermocouple, to produce a square step signal, see waveform W. This corresponds to point A on the waveform shown in FIG. 4, which corresponds to the initiation of substantial gas production. Thus the high level of output W corresponds to the fully-charged battery condition having been attained. If desired, output W can be supplied directly, possibly with only a polarity change, to the circuit 10 or 20. However, in the arrangement of FIG. 4, signal W is first supplied to a conventional integrator circuit 41 which transforms the square step into a gently sloping waveform X. Thus the switchover between the output levels of circuit 10 and 20 is also gradual. This has the advantage of avoiding sudden voltage visible variations of the lighting of the motor-vehicle. It will be noted that this produces a delay in reaching the second direct output level.

If, after a period of time, gassing stops (point B on the waveform of FIG. 4), signal W and hence signal X again switch and battery charging at the higher rate recommences.

Various modifications may be made to the above-described embodiments. For example, the transistors T; T1, T2 may be replaced by any convenient electronic, electrical or mechanical switch devices.

Also the recombinator and thermocouple are optional; for example a device sensitive to the pressure of the gas within the battery may be used, the device determining when gassing begins by the accompanying rise in pressure. DE-A-2310403 discloses several suitable devices, e.g. a piston, a flexible membrane or an inflatable balloon. Any other suitable arrangement for detecting the onset of substantial gas production or, indeed, any arrangement for detecting the state of battery charge may be employed.

As mentioned previously, the operation of the switch device may be abrupt, but preferably it is gradual to avoid voltage fluctuations and dimming of the lights. Diode D may be omitted if desired.

I claim:

1. A battery charging arrangement, comprising a generator (32); a voltage controller (31); means (40) for producing an output signal (W) which changes relatively abruptly when a battery charge exceeds a predetermined level; means (41) for receiving said signal (W) and producing therefrom a linearly changing signal (X); further means (10, 20) receiving said signal (X) and having at least two resistors (R1, R2) variable independently from one another and switch means (T; T1, T2) connected with said resistors and switching in dependence on the signal (X) and producing the output signal (S) having two adjustable levels (S1 and S2) and supplied to said voltage controller as control voltage.

2. An arrangement as defined in claim 1, wherein the variable resistors (R1, R2) are connected in parallel and the switch means (T) is connected in series with only one of them.

3. An arrangement as defined in claim 1, wherein the variable resistors (R1, R2) are connected in parallel and the switch means comprises a first switch device (T1) in series with the first resistor and a second switch device (T2) in series with the second resistor.

4. An arrangement as defined in claim 1, wherein the switch means comprises at least one transistor (T, T1, T2) having a base electrode to which the signal (X) is applied.

5. An arrangement as defined in claim 1, wherein said means for producing an output signal (W) comprises a recombinator of hydrogen and oxygen gases produced by a battery, and a transducer responsive to a temperature produced by recombination reaction to produce the signal (X).

6. An arrangement as defined in claim 1, wherein said means for producing an output signal (W) comprises a device sensitive to gas pressure within a battery.

7. An arrangement as defined in claim 1; and further comprising means (41) for ensuring a gradual operation of the switch means (T; T1, T2) and provided between said means for producing an output signal (W) and said further means.

8. An arrangement as defined in claim 1, wherein said generator is a three-phase generator, said further means having an output connected to an input of said voltage controller.

* * * * *